United States Patent
Hedayat

(10) Patent No.: US 9,698,918 B2
(45) Date of Patent: Jul. 4, 2017

(54) DISTRIBUTED ADAPTIVE CCA MECHANISMS

(71) Applicant: NEWRACOM, Inc., Irvine, CA (US)

(72) Inventor: Ahmad Reza Hedayat, Irvine, CA (US)

(73) Assignee: NEWRACOM, Inc., Irvine, CA (US)

( * ) Notice: Subject to any disclaimer, the term of this patent is extended or adjusted under 35 U.S.C. 154(b) by 136 days.

(21) Appl. No.: 14/852,226

(22) Filed: Sep. 11, 2015

(65) Prior Publication Data

US 2016/0080954 A1 Mar. 17, 2016

Related U.S. Application Data

(60) Provisional application No. 62/049,800, filed on Sep. 12, 2014, provisional application No. 62/074,544, filed on Nov. 3, 2014, provisional application No. 62/080,033, filed on Nov. 14, 2014.

(51) Int. Cl.
| | |
|---|---|
| *H04W 4/00* | (2009.01) |
| *H04B 17/318* | (2015.01) |
| *H04W 74/08* | (2009.01) |
| *H04W 84/12* | (2009.01) |

(52) U.S. Cl.
CPC ...... *H04B 17/318* (2015.01); *H04W 74/0808* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2011/0164527 A1* | 7/2011 | Mishra | H04L 45/123 370/252 |
| 2013/0208607 A1 | 8/2013 | Abraham et al. | |
| 2013/0223250 A1 | 8/2013 | Matsuo et al. | |
| 2014/0050156 A1* | 2/2014 | Chan | H04W 76/025 370/329 |
| 2015/0071180 A1 | 3/2015 | Cavalcante et al. | |
| 2015/0071270 A1* | 3/2015 | Harel | H04W 72/0413 370/338 |

(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

(Continued)

*Primary Examiner* — Anh-Vu Ly
(74) *Attorney, Agent, or Firm* — NDWE LLP

(57) ABSTRACT

A method implemented by a first network device where the method provides an adaptive clear channel assessment (CCA) by collecting a neighboring network device set for a wireless local area network (WLAN). The method detects a wireless signal from a second network device on a wireless medium. A signal quality of the wireless signal is then determined. An identity of the second network device is also determined. The second network device is then added to the neighboring network device set of the first network device, in response to determining that the second network device is a neighbor based on the signal quality of the wireless signal.

9 Claims, 8 Drawing Sheets

(56) References Cited

U.S. PATENT DOCUMENTS

| | | | |
|---|---|---|---|
| 2015/0124744 A1* | 5/2015 | Zhu | H04W 72/1257 |
| | | | 370/329 |
| 2015/0319700 A1* | 11/2015 | Oteri | H04W 52/10 |
| | | | 455/127.1 |
| 2016/0014807 A1 | 1/2016 | Ghosh | |
| 2016/0050691 A1 | 2/2016 | Jauh et al. | |
| 2016/0056929 A1* | 2/2016 | Kwon | H04L 5/006 |
| | | | 370/338 |

OTHER PUBLICATIONS

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

\* cited by examiner

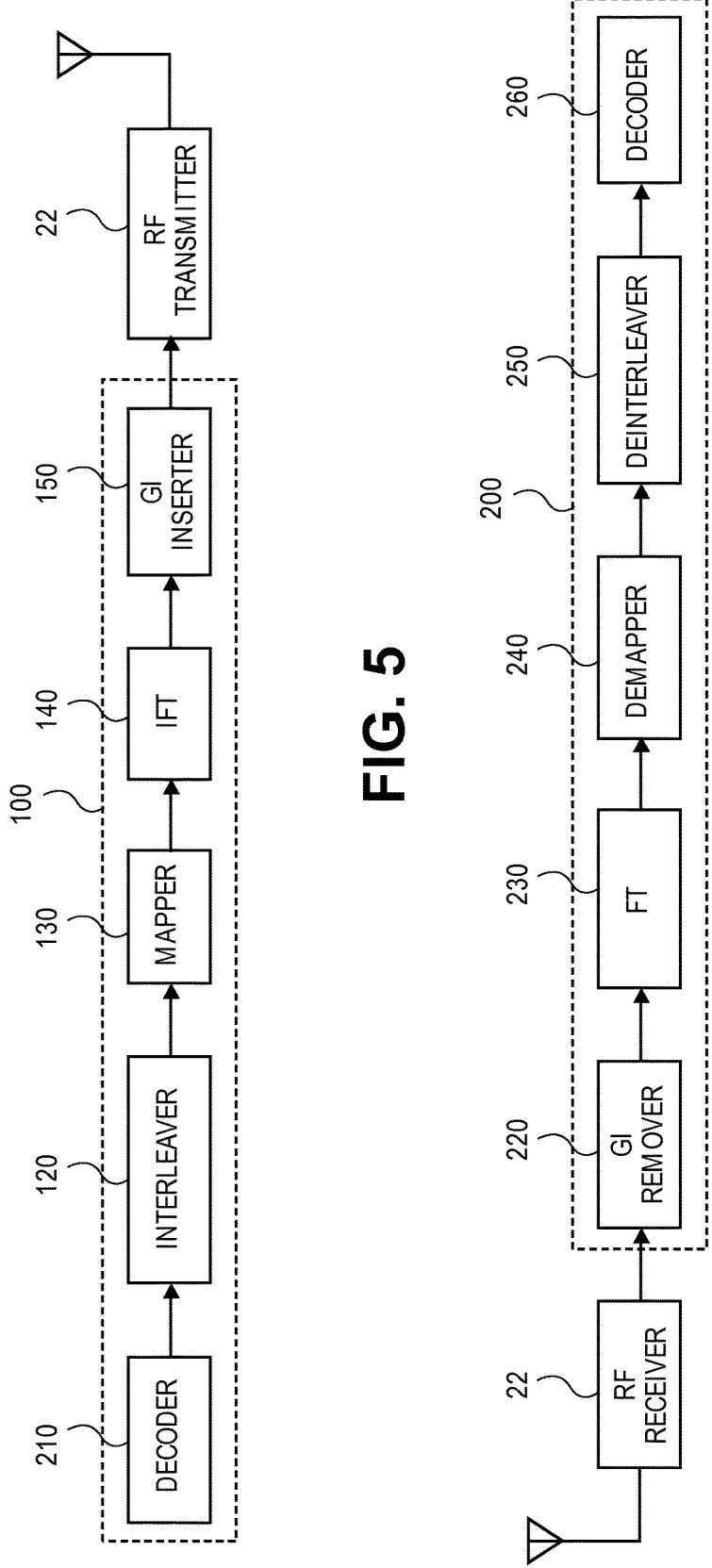

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

DISTRIBUTED ADAPTIVE CCA MECHANISMS

This application claims priority to U.S. Provisional Patent Application No. 62/049,800, filed on Sep. 12, 2014, U.S. Provisional Patent Application No. 62/074,544 filed Nov. 3, 2014, and U.S. Provisional Patent Application No. 62/080,033 filed Nov. 14, 2014.

FIELD OF INVENTION

The embodiments described herein are related to the field of wireless local area network (WLAN) operation. More specifically, the embodiments described herein relate to a method and system for an adaptive threshold process and collection of a neighboring network device set for improving the efficiency in assessing the availability of the wireless medium for communication amongst a set of network devices. Other embodiments are also disclosed.

BACKGROUND

Institute of Electrical and Electronics Engineers (IEEE) 802.11 is a set of physical and media access control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

Communication on unlicensed spectrums, such as any given channel of either the 2.4 GHz or the 5 GHz bands, between network devices of the WLAN utilizes the clear channel assessment (CCA) protocol. CCA is defined in the IEEE 802.11 standard as part of the Physical Medium Dependent (PMD) and Physical Layer Convergence Protocol (PLCP) layer. CCA is composed of two related functions, carrier sense (CS) and energy detection (ED).

Carrier sense (CS) refers to the ability of the receiver to detect and decode an incoming Wi-Fi signal preamble. In addition, CCA must be reported as Busy when another Wi-Fi signal preamble is detected, and must be held as Busy for the length of the received frame as indicated in the frame's PLCP Length field. Typically, any incoming Wi-Fi frame whose PLCP header can be decoded will cause CCA to report the medium as Busy for the time required for the frame transmission to complete.

The PLCP header Length field indicates either the number of microseconds required for transmission of the full frame MAC protocol data unit (MPDU) payload, or the number of octets carried in the frame MPDU payload which is then used in combination with the Rate field (which identifies the modulation used for the payload) to determine the time required for MPDU transmission. In any case, the length or rate+length fields of the MPDU give the receiver the information required to de-modulate the frame and determine how long the wireless medium will be busy.

Energy detection (ED) refers to the ability of the receiver to detect the energy level present on a given channel where a discernable Wi-Fi preamble cannot be decoded. ED is based on the noise floor, ambient energy, interference sources, and unidentifiable Wi-Fi transmissions that may have been corrupted but can no longer be decoded. ED cannot predict the exact length of time the wireless medium will be busy, instead ED must sample the wireless medium in every slot time to determine if the energy still exists. ED utilizes a threshold level above which the detected energy level must exceed before the wireless medium is classified as busy or idle. This minimum threshold level can be referred to as the ED threshold level or CCA sensitivity level. The CCA sensitivity level is usually much lower for valid Wi-Fi signals that can be decoded using CS than it is for other signals where a discernable preamble cannot be decoded.

Received signal strength indication (RSSI) is another measurement of the energy or power present in a received radio frequency (RF) signal that is generated by devices implementing IEEE 802.11. The units for RSSI values are not specified and can have an arbitrary range where a greater RSSI value indicates a stronger signal. However, a reference power level is usually considered, such as 1 mW, and the received power level of a signal is compared to the reference level, such as the ratio of the received signal power level to the reference power level. If such ratio is expressed as a logarithmic level, the dBm unit for power level is obtained. The RSSI value can be utilized in processes such as the request to send/clear to send (RTS/CTS) exchange process to identify in conjunction with other factors when a wireless medium is Idle.

SUMMARY

The embodiments encompass a method implemented by a first network device where the method provides an adaptive clear channel assessment (CCA) by collecting a neighboring network device set for a wireless local area network (WLAN). The method detects a wireless signal from a second network device on a wireless medium. A signal quality of the wireless signal is then determined. An identity of the second network device is also determined. The second network device is then added to the neighboring network device set of the first network device, in response to determining that the second network device is a neighbor based on the signal quality of the wireless signal. Further, a set of signal quality values for the neighbor network device are collected and stored for a particular duration or number of received frames from the neighbor network device.

In another embodiment, a method is implemented by a first network device to provide the CCA process in the WLAN to determine an availability of a wireless channel in the WLAN. The method includes detecting, by the first network device, a wireless signal from a second network device on a wireless medium. It is determined whether a target network device of the wireless signal is a neighbor of the first network device. Then a target device threshold is compared against an average of the set of signal quality values associated with the target network device in response to determining that the target network device is a neighbor of the first network device. When the average signal quality value is above the target network device threshold, the wireless medium/channel is determined to be busy. Otherwise, when the average signal quality value is below the target network device threshold, the wireless medium/channel is determined to be idle.

In a further embodiment, a network device implements a method to improve efficiency for CCA in the WLAN. The network device includes a non-transitory machine readable medium having stored therein an adaptive threshold module, and a processor coupled to the non-transitory machine readable medium, the processor configured to execute the adaptive threshold module, the adaptive threshold module configured to detect a wireless signal from a second network device on a wireless medium, to determine a signal quality of the wireless signal, to determine an identity of the second network device, and to add the second network device to the neighboring network device set of the first network device, in response to determining that the second network device is a neighbor based on the signal quality of the wireless signal. The adaptive threshold module may also be configured such that a set of signal quality values for the neighbor network device are collected and stored for a particular duration or number of received frames from the neighbor network device.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 5 is a schematic block diagram exemplifying a transmitting signal processor in a WLAN device.

FIG. 6 is a schematic block diagram exemplifying a receiving signal processing unit in the WLAN.

DETAILED DESCRIPTION

Figure 1:
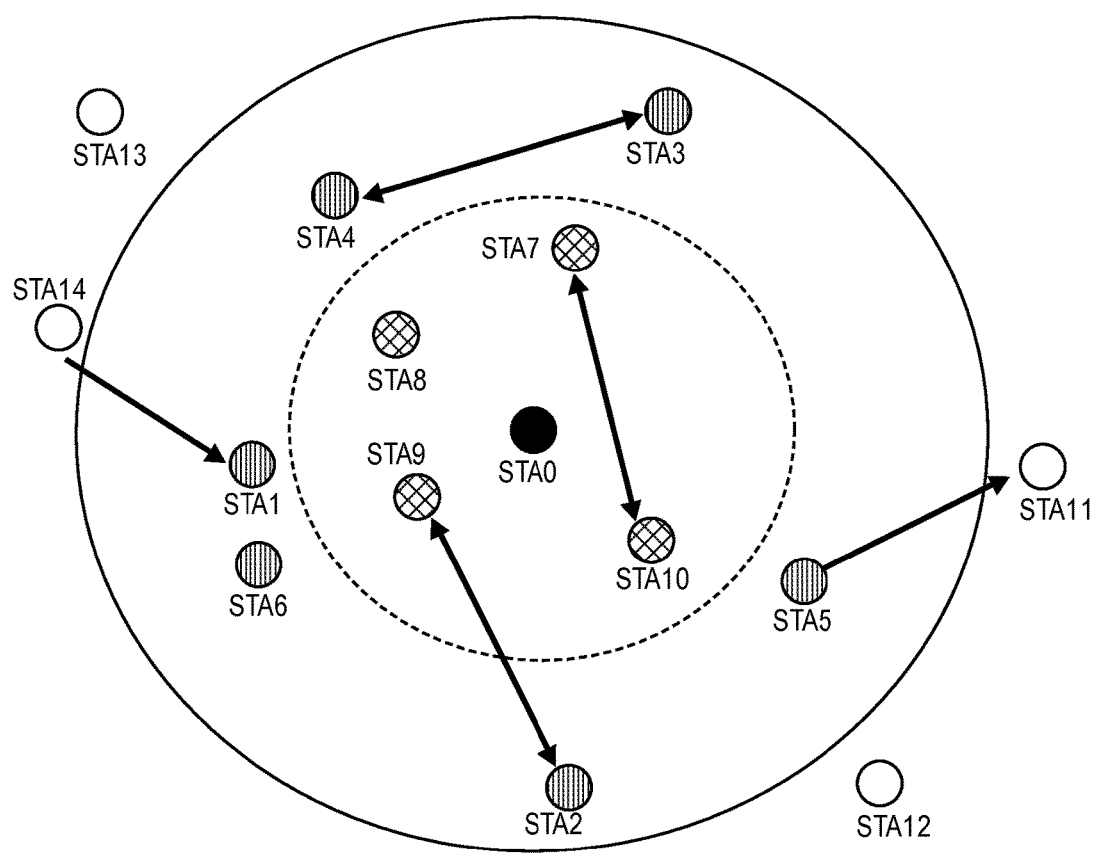
FIG. 1 is a diagram of one embodiment of a WLAN that illustrates an example of possible issues related to the use of adaptive threshold processes.

The embodiments provide a method and system for wireless medium assessment implemented by a network device (e.g., a station such as an access point) in a wireless communication system such as a wireless local area network (WLAN) implementing IEEE 802.11. The method includes collecting and maintaining information about nearby network devices in the wireless communication system by measuring the signal quality (e.g., received signal strength indicator (RSSI), energy level, signal-to-noise ratio, or similar metrics) of received frames from such network devices. The method utilizes this information about nearby network devices to implement an adaptive threshold (e.g., a clear channel assessment (CCA) threshold) process during subsequent transmissions. This adaptive threshold process uses multiple thresholds to increase the likelihood of transmission over a wireless medium by the network device. The adaptive threshold process includes safeguards to ensure that the transmissions of the network device will not interfere with its neighbors when assessing whether a shared wireless medium, such as a wireless channel or set of wireless channels, is in use (e.g., Idle or Busy). A 'set,' as used herein refers to any positive whole number of items. The method may identify neighbors of a given network device by monitoring the communications of the neighbors on the shared wireless mediums. This monitoring can include identifying a target receiver and/or a source transmitter of each frame that is received during the wireless medium assessment.

When the network device seeks to transmit over a wireless medium, a check is made whether there is any current transmission and if so whether the current transmission is directed at a neighbor of the network device. The process may also take into account a signal quality value/level of the transmission. If the received frames are not directed at a neighbor of the network device and/or the received frames have a signal quality value/level below an adaptive threshold (e.g., a CCA threshold), then the network device may deem the wireless medium available for transmission if other potential qualifying conditions related to the likelihood of interfering with the communication of neighboring nodes on the wireless medium are met.

In the following description, numerous specific details are set forth. However, it is understood that embodiments may be practiced without these specific details. In other instances, well-known circuits, structures and techniques have not been shown in detail in order not to obscure the understanding of this description. It will be appreciated, however, by one skilled in the art that the embodiments may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations and access points in wireless communications systems such as wireless local area network (WLAN) including WLANs implementing IEEE 802.11. Stations are devices connected to and communicating in a WLAN including client or user devices that connect to the WLAN via access points. Access points are network devices that may be specialized wireless access points that can communicate with other network devices in the WLAN via the wireless medium or via wired connections.

IEEE 802.11 based WLAN systems rely on Clear-Channel-Assessment (CCA), in the physical layer (PHY) that determines the current state of use of the wireless medium (WM), such that a station will access a given wireless channel only when the WM becomes idle (i.e. there is no transmission on the wireless medium and other qualifying conditions are met). Some CCA rule mechanisms, for example some of the rule mechanisms defined in IEEE 802.11, indicate that the primary channel is Busy, if one of the conditions listed in Table I is met, otherwise the primary channel is determined to be Idle. If the primary channel is idle, then the PHY layer will check the secondary channels.

TABLE I

| Operating Channel Width | Conditions |
| --- | --- |
| 20 Mhz, 40 MHz, 80 MHz, 160 MHz or 80 + 80 MHz | The start of a 20 MHz NON_HT PDU in the primary 20 MHz channel as defined in 18.3.10.6 (CCA requirements). The start of an HT PPDU under the conditions defined in 20.3.21.5 (CCA sensitivity). The start of a 20 MHz VHT PPDU in the primary 20 MHz channel at or above −82 dBm. |
| 40 MHz, 80 MHz, 160 MHz or 80 + 80 MH z | The start of a 40 MHz non-HT duplicate or VHT PPDU in the primary 40 MHz channel at or above −79 dBm |
| 80 MHz, 160 MHz or 80 + 80 MHz | The start of an 80 MHz non-HT duplicate or VHT PPDU in the primary 80 MHz channel at or above −76 dBM |
| 160 MHz or 80 + 80 MHz | The start of a 160 MHz or 80 + 80 MHz non-HT duplicate or VHT PPDU at or above −73 dBM |

However, with the increased demand on WLANs there is a need for more aggressive channel access, which requires increasing the CCA threshold value, to increase system throughput. However, increasing the CCA threshold value may result in more frequent packet collision and degradation of Quality of Service (QoS) of packet delivery.

WLAN communication systems are being deployed in diverse environments. These environments are characterized by the existence of many access points (AP) and non-AP stations in geographically limited areas. Increased interference from neighboring network devices gives rise to performance degradation. Additionally, WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved throughput requiring improvements in the availability of the wireless medium.

In this regard, when a station (STA) is transmitting a packet over the wireless medium, nearby STAs are not allowed to transmit to prevent collisions from happening. The area that nearby STAs are prohibited is determined by the CCA sensitivity or threshold value. In a dense WLAN environment, which is a target of WLAN development, a CCA threshold value (−82 dBm for 20 MHz) might be too conservative in some scenarios such that transmission efficiency is diminished or sub-optimal. To enhance the WLAN system throughput and network efficiency, increasing the CCA threshold value is a possible solution. However, simply increasing the CCA threshold value (i.e., lowering CCA sensitivity) may cause other problems that may in some instances degrade network performance. The CCA threshold value is used herein as a value of CCA sensitivity representing a current signal quality level above which a signal must reach to render an associated wireless channel busy.

If the CCA threshold value is increased in a WLAN, transmission throughput could be increased, because each STA can be more aggressive in assessing the wireless medium, and thus the STA may transmit a frame more frequently, however, this more aggressive transmission scheme may occur even though there is a frame already occupying the wireless medium. This can result in an increased probability of packet collision, and can result in severe performance degradation under some circumstances or configurations such as for cell edge STAs.

Wireless communications systems and network devices implementing IEEE 802.11 are provided by way of example and not limitation. One of ordinary skill in the art would understand that other similar wireless communication technologies can apply the principles and structures described herein. Similarly, the use of a CCA threshold is given as the measure for wireless medium availability assessment by way of example. However, any adaptive threshold associated with a measure of signal quality can be utilized consistent with the principles and structures described herein.

FIG. 1 is a diagram of one embodiment of a WLAN that illustrates an example of possible issues of increasing an adaptive threshold value. As shown in this figure, when a first network device (e.g., station (STA0)) seeks to transmit a frame to a second network device (e.g., STA8), other transmissions between network devices in the vicinity of the first network device may affect the availability of the shared wireless medium. The diagram illustrates different scenarios for possible transmissions that may affect the first network device's ability to utilize the wireless medium. These scenarios are affected by the adaptive threshold utilized by the first network device. In the example of FIG. 1, a first threshold is illustrated as a solid line (e.g., a 82 dBm threshold) and a second threshold is illustrated as a dotted line (e.g., a −72 dBm threshold). All network devices within the radius of a threshold may be considered to be neighbors of the network device in association with the threshold. Thus, increasing a threshold may reduce the number of neighbors and may inversely increase the number of network devices that may be impacted by the transmission of the first network device.

Without the benefit of the embodiments disclosed herein, a network device, in the illustrated example STA0, will generally asses transmissions on a wireless medium as not impacting its decision to transmit if they fall below the threshold. For example, STAs 11-14 are all positioned such that their transmissions are below a standard threshold (e.g., a −82 dBm CCA threshold). Any metric or measurement of signal quality can be utilized for the assessment of whether a network device meets or exceeds a threshold. In such an implementation, any transmission of STAs 11-14 would be ignored by STA0. However, transmissions of STAs 1-10 would affect (likely prohibiting) the ability of STA0 to transmit over a shared wireless medium when using a −82 dBm CCA threshold. Increasing the threshold (e.g., to a −72 dBm CCA threshold) excludes a greater number of network device transmissions (e.g., STAs 1-6) from consideration. However, there can be an adverse impact in particular on network devices in closer proximity (e.g., STAs 8-10) in terms of collision when these network devices are the target destinations of the transmissions of source network devices that are below the threshold. For example, the transmissions between STA2 and STA9 in the illustrated example of FIG. 1 may be problematic when a decreased CCA threshold is used. The embodiments seek to avoid such collisions by tracking the neighboring network devices and avoiding transmission when there is a transmission targeting these neighbor network devices. This policy can be applied regardless of the threshold. For example, this could be applied in the case of the transmission between STA 4 and STA 3 using the standard threshold in this example.

The consideration of when a network device transmits may not be solely dependent on the determination of transmission signal quality or whether the target of the transmission on the wireless medium is a neighboring network device. Other considerations can be based on the protocols and format of the data and control message exchanges using the wireless medium. For example, the process can await expiration of distributed coordination function (DCF) interframe spacing (IFS)(DIFS), performance of a backoff, and similar interframe spacing considerations. The embodiments for adaptive threshold systems and processes provide additional criteria for determining whether a wireless medium is available for transmission by the network device seeking to transmit data. The additional criteria is based on the use of the source transmitting information and/or target receiver information of a frame that occupies the wireless medium when the network device performs a channel assessment process such as CCA. For this purpose, a network device can maintain a set of neighboring network devices in a WLAN, wherein the set comprises information on network devices that the first network device's pending transmission may interfere with. When the first network device assesses the wireless medium (e.g., via CCA), even though a received signal quality level for a frame currently occupying the wireless medium is below a threshold, the first network device may not be allowed to access the medium in accordance with the processes for the adaptive threshold described herein, for example if information of the target receiver of the frame matches with a network device within the set of tracked neighboring network devices.

There can be multiple different embodiments for maintaining the set of neighboring network devices (e.g., stations including access points in a WLAN) consistent with the basic concept mentioned above, which will be explained below. One of ordinary skill would understand that the embodiments provided herein are made by way of example and not limitation and that other variations to these embodiments are within the scope of this disclosure.

In one example embodiment, CCA is utilized to assess whether the shared wireless medium is available. The CCA threshold is fixed in current IEEE amendments. However, it certain scenarios it may be better to adapt a CCA threshold, for each basic service set (BSS), to an optimum level that depends on the locations of the network devices in the WLAN, such as the locations of STAs vs the access point (AP), and neighboring BSS/overlapping BSS (OBSS). For instance, in a BSS where the STAs are close to the AP, the STAs would backoff if they receive a frame from any node within their default −82 dBm coverage. However, given the location of the nodes in this BSS, they can adopt a CCA threshold that is greater than −82 dBm as long as the AP receives signals from all its STAs above the adapted CCA threshold and as long as STAs defer to each other based on the adapted CCA value.

Adapting the CCA level should consider potential STAs nearby. In a case where two BSSs (operating in the same frequency) are relatively disjoint, adopting a CCA greater than −82 dBm by either BSS is less likely to hurt the operation of the other BSS significantly (for instance in apartment complexes and similar crowded environments), but this is not always the case.

An immediate consequence of a less sensitive CCA threshold is additional hidden nodes that appear, which are nodes that are unknown to a transmitting STA. All the classical problems and solutions for dealing with hidden nodes apply to the newly introduced hidden nodes. Thus, the embodiments described herein provide processes and systems that avoid additional problems, such as collisions, higher interference, and similar problems that result from an aggressive CCA, which affects the newly introduced hidden nodes.

Figure 2:
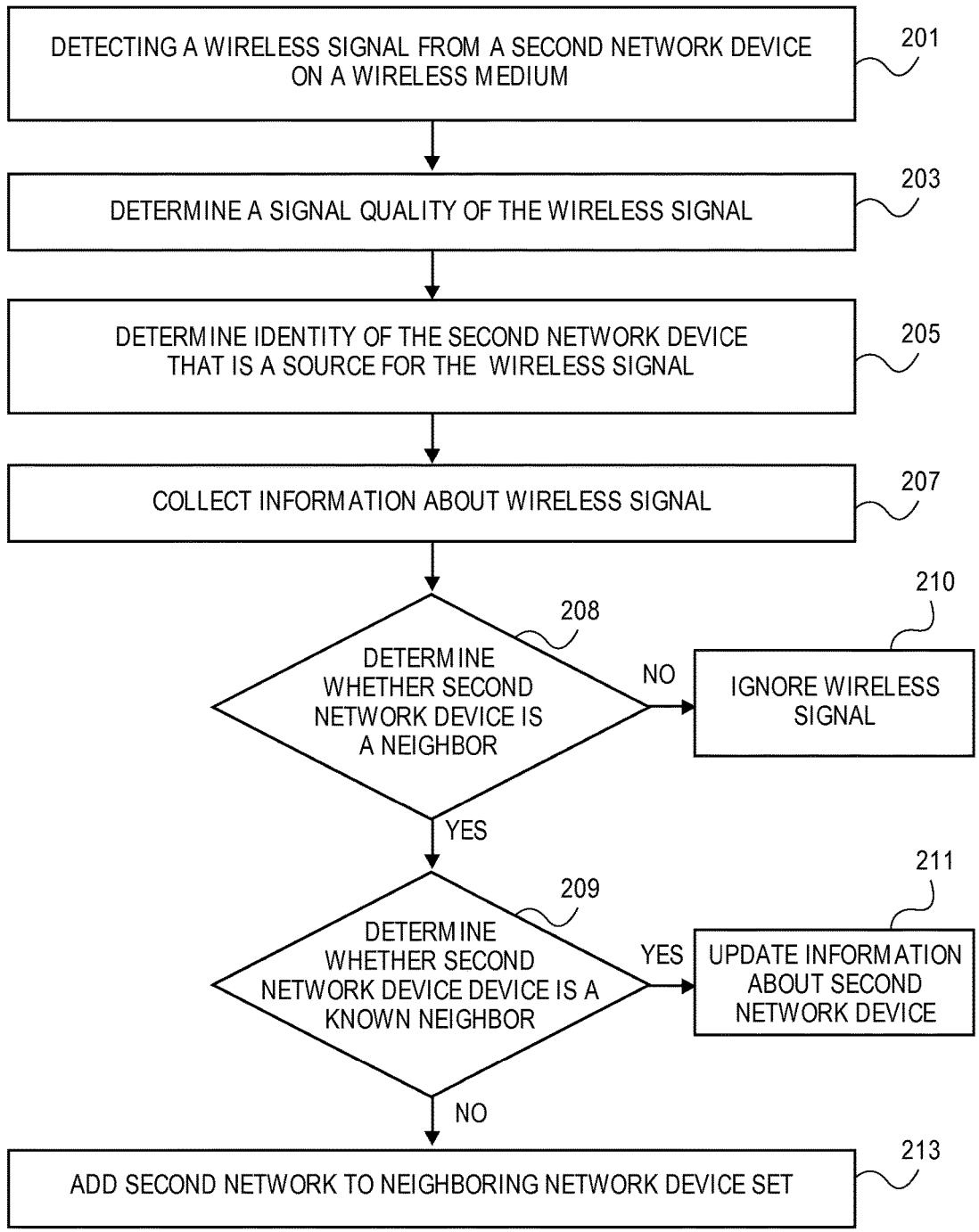
FIG. 2 is a flowchart of one embodiment of a process for generating a neighboring network device set.

FIG. 2 is a flowchart of one embodiment of the neighboring network device set management process. This example embodiment provides one embodiment of the neighboring network device tracking of the adaptive threshold process and more specific implementation examples are given in relation to the neighbor network device tracking process. The method described with relation to FIG. 2 is implemented by a network device, such as a station (including an access point or a client station) in a WLAN. Implementation is on a network device by network device basis. Each network device that is configured to use an adaptive CCA threshold needs to know about its neighboring network devices (i.e., neighboring STAs in the WLAN) so that the network device avoids adopting less sensitive thresholds (e.g., CCA thresholds) than the signal quality of the frames destined to those neighboring network devices. To know about its surroundings, each network device monitors the frames that it receives and registers the transmitting address (TA) of those frames. The embodiments introduce this TA information into the physical layer (PHY) header in the full TA format or in a shortened format. In some embodiments, the TA information can be presented as any one of a number of shorter forms of STA identification, or similar network device identification, which can be conveyed inside a signal field of the PHY/physical layer convergence procedure (PHY/PLCP) header. Examples of such identifications are AID (association ID), PAID (partial association ID), PBSSID (partial BSS ID), and GID (group ID) in IEEE 802.11 ac, but there could be new/alternate identifiers (IDs) based on other forms for shortening AID, BSSID, and similar identifiers. The full or short representation of the identities of the transmitting station of each frame are registered (i.e., recorded in a set of tracked neighboring network devices).

The implementing network device performs this neighboring network device tracking process when it is awake (some network devices have an inactive mode such as a sleep mode). After some time, the network device realizes what network devices are in its neighborhood, based on appearance of their IDs in past received frames. In some embodiments, the receiving ID and transmitting ID of a network device can be assumed to be the same, or even if they are different (due to different number of bits, bit assignment or other reasons), then there is a known relationship between these two IDs that can be verified by all network devices implementing this adaptive threshold process. This means that all network devices can identify whether a pair of transmitting and receiving IDs belong to the same network device or not.

The set of neighboring network devices can be utilized for assessing whether a wireless medium is idle. When a network device has formed such a set, which is referred to as a neighboring network device set, the neighboring network device set can be checked when the implementing network device receives a frame (which is not destined to the network device itself). The network device decides whether the wireless medium is available or not based on a set of factors including the identity of the receiving neighboring network device indicated in the frame and the signal quality (e.g., an RSSI) of the transmitting network device, as described further herein. However, in the adaptive threshold process each network device is allowed to adapt the threshold (e.g., a CCA threshold) if it has gathered a history of frame exchanges of its neighbors for a minimum duration of time, or a minimum normalized number of frame exchanges. This minimum history can be configured by an administrator or similar entity to be any amount of time or number of frames. For example, power-saving STAs in WLANs may only be allowed to use adaptive CCA when they have observed the wireless channel long enough, i.e., their total awake time reaches the minimum duration of time required. In some embodiments, there may be a maximum on the single sleep time duration as well, where if a network device is in sleep mode for a duration of time longer than a given value, the network device resets its neighboring network device sets and starts anew because the collected information is out of date or stale.

In one embodiment, the neighboring network device set management process is initiated at the network device in response to detecting a wireless signal from a second network device on a wireless medium (Block 201). For example, a network device, such as a WLAN device implementing an adaptive threshold process such as an adaptive CCA process and neighboring network device set management process, may implement this process. The implementing network device can be any station including a non-AP station or an AP. Referring to the example wireless communication system of FIG. 1, the implementing network device STA0, detects the transmission between other stations on the shared wireless medium such as any one of the transmissions between STA7 and STA10, STA2 and STA9, STA4 and STA3, STA14 and STA1, and STA5 and STA11. While the Figure shows these transmissions as seemingly simultaneous, one skilled in the art would understand that if the transmissions are on a shared wireless medium, and if the transmitting STAs are within each other's coverage, then only non-interfering transmissions in a WLAN that operate based on the IEEE 802.11 specification could be taking place at any given time. The different transmissions are shown for sake of illustrating differing transmission scenarios.

The signal quality of the received wireless signal can then be determined (Block 203). For example, the STA0 can determine an RSSI, signal to noise ratio, ED level or similar measure of the quality of the wireless signal transmitting the received frame to be utilized to determine the proximity of the transmitting STA (i.e., neighbor status of the transmitting STA relative to STA0). In some embodiments, the signal quality is taken as an average of the signal quality over any period of time or number of frames received from a given network device or as an average signal quality during the last unit of observation interval.

The wireless signal is then examined to determine the identity of the second network device (Block 205). The information in the received wireless signal, e.g. a received frame, can comprise any combination of AID, PAID, MAC address, BSSID, Partial BSSID, GID, and/or similar identifier for either the transmitting network device that is in the PHY header and thereby enables the identification of the transmitting network device and maintenance of the neighboring network device set without having to decode other information in the transmission such as MAC layer information. Similarly, the received wireless signal can have additional information collected relating to the timing and similar circumstances of its transmission (Block 207). For example, the process can record the latest time stamp when each ID appeared in any received frame, the number of instances per unit time that the ID appeared in captured frames, and similar information. This information is collected to update the tracking of such metrics associated with each neighboring network device ID. In some embodiments, a history of the past T seconds, T being any positive number of seconds, can be maintained where the network device has recorded the frames exchanged by its neighboring network devices. This history can be used to compute a moving average or similar computation for assessing signal quality instead of using a most recent signal quality to avoid having an inaccurate signal quality determination affect the neighboring network device set management process. Using a moving average of the signal quality, if the neighboring network devices move out of the neighborhood their presence is gradually removed from the neighboring network device set or even if tracked they may be excluded from those network devices considered neighbors. In some embodiments, the neighboring network device set is limited to those network devices within a particular proximity using any metric (e.g., RSSI within a CCA threshold). However, in other embodiments, neighboring network devices outside the threshold area are also tracked, but do not factor into computations related to identifying neighbors. For example, some network devices may move into and out of the proximity of the network device or have varied readings near the border of the proximity. In such cases, in particular where a moving average is used for the signal quality, the history may include signal quality values that are both within and outside of a given threshold for considering an associated network device as a neighbor. Thus, a network device may be tracked that has a signal quality that is proximate to the threshold or where there is at least one signal quality value in the history that meets the threshold.

A determination is then made whether the second network device is a neighbor of the implementing (first) network device (Block 208). In one embodiment, a check may first be made to determine whether the signal quality of the wireless signal received from the second network device exceeds a threshold, such as the CCA threshold. Any metric for signal quality can be utilized as a threshold for deciding whether a network device is a neighbor where the metric is generally indicative of the likelihood of interference between the implementing network device and the second network device when transmitting on the same channel. In some embodiments, multiple levels of thresholds can be utilized to create multiple levels of neighborhood relationships. Each neighborhood relationship set may later be used to apply different adaptive thresholds based on a target receiver being in the respective neighborhood set. A basic CCA threshold is often −82 dBm where any wireless signal below this threshold is not identified as a neighboring network device. A more aggressive CCA threshold (e.g., −72 dBm) could be utilized in some scenarios that enables greater granularity when establishing neighborhood sets and potentially enabling greater use of the wireless channel as described in FIG. 3 below. One skilled in the art would understand that the combination and the number of thresholds using any metric indicative of wireless signal strength or interference on a given channel between network devices can be utilized consistent with the principles and structures of the embodiments described herein. If a network device is determined not to be a neighbor of the implementing (first) network device based on properties of the wireless signal, then the wireless signal may be ignored during this process (Block 210).

However, if the wireless signal indicates that the second network device does qualify as a neighbor (e.g., by exceeding a current threshold), then the process proceeds to determine whether the second network device (i.e., the transmitting network device) is already known to the implementing (first) network device (Block 209). This can be done by looking in the set of neighboring network devices maintained by the implementing network device (i.e., it is known to the implementing network device if the second network device is in the set of neighboring network devices) by looking up the transmitting ID in a neighboring network device set. If the second network device is known to the implementing network device, then the process updates the information it maintains about the second network device (Block 211). For example, if the transmitting network device is known to the implementing network device then the existing transmitting network device entry in a neighboring network device set (e.g., a list or similar data structure) can be updated with all of the collected data. In one example, the entry can be updated with a new signal quality reading, an updated average signal quality, updated time stamp information or a similar recordation can take place. If the second network device is not known to the implementing device, then the second network device is added to the neighboring network device sets (Block 213). For example, if there is not an existing entry, then the process creates a network device entry using the ID of the network device in the neighboring network device set. The neighboring network device set can be any type of data structure, including a database, a simple list, a linked list or similar data structure. In this example, the network device entry can record any identification information, including the AID, PAID, MAC address (which may require further processing of the MAC layer of the frame), BSSID, Partial BSSID, or similar ID. The network device entry can also include signal quality information, including the most recent signal quality measurement (e.g., an RSSI value), an average signal quality value, or similar signal quality information. The network device entry can also include timing information such as recent timestamp information or similar information.

Although described as only including devices in the neighboring network device set that are considered neighbors, in another embodiment the neighboring network device set may include all devices in the network or all devices that the implementing station has detected a frame, or all devices that the implementing network device has detected as a target device in a frame. In these embodiments, the neighboring network device set may indicate which devices are considered neighbors and a confidence level associated with this determination. Also in these embodiments, the neighboring network device set may indicate which devices have consistently appeared as a target device in detected frames but no frame or few frames have been detected from these devices, where in such cases the implementing device indicates such devices as non-neighbor devices and associates a confidence level with this determination.

Returning to the example of FIG. 1, where STA0 is the implementing STA. When STA0 is awake, it records the relevant IDs (TA/RA or PAIDs/BSSIDs and their short forms that might appear in PHY/PLCP header) of the frames that STA0 captures. STA0 establishes the known relationship between the transmitting and receiving IDs (PAID/PBSSID and/or the short forms of the AIDs or the short forms of the AID of the second and third STAs). This relationship can be stored in the neighboring network device set for devices that are determined to be neighbors of STA0. The neighboring network device set is gradually updated whenever new IDs are collected for neighbors of STA0. So after a given time period, STA0 will have sufficient data for the transmit IDs related to STAs 1-10 that appear on the frames it has captured and STA0 can infer that these stations are nearby, i.e., within −82 dBm-coverage of STA0. This constitutes the neighboring network device set for STA0. The use of a neighboring network device set or any data in it can be limited until a confidence interval or period has elapsed that indicates sufficient time has elapsed since the collection of information began to have a high confidence that all neighboring network devices have been identified.

The embodiments for managing the neighboring network device set discuss the use of IDs for determining a transmitting network device and a receiving network device. In some embodiments this information is determined using a received frame in the form of a PPDU. These may be orthogonal frequency division multiplexing (OFDM)/orthogonal frequency division multiple access (OFDMA) PPDUs. Each OFDM/OFDMA PPDU has SIG symbols (e.g. VHT SIG-A/B and HE SIG-A/B) where some ID of the recipient of the PPDU is indicated (e.g., PAID in case the recipient is a STA and PBSSID in case the recipient is an AP). In some embodiments, the PPDU format can be modified to add some identification of the transmitting STA to HE SIG-A/B in the PHY header. Depending on the number of bits assigned to the receiving and transmitting IDs in the PHY header, exact or shorter IDs can be used.

If the same number of bits are assigned to the short mapping or representations of the receiver/transmitter IDs (in HE SIG-A/B), then a STA can be identified by PAID, and an AP is identified by PBSSID (regardless if they are the recipient or transmitter of the frame). If the number of bits assigned to the short mapping or representations of the receiver and transmitter IDs are different, then: (a) as a recipient a STA is identified by PAID, and an AP is identified by PBSSID, and (b) as a transmitter a STA is identified by a shortened PAID (SPAID), and an AP is identified by a shortened PBSSID (SPBSSID). The PAID can have a one-to-one mapping with its shortened version, SPAID. Also, the PBSSID can have a one-to-one mapping with its shortened version, SPBSSID. The one-to-one mapping is a priori known in the WLAN and all receiving STAs can establish the mapping between an ID and its shortened version. In some embodiments independent BSS frames can also be utilized to collect data about neighboring network devices. For IBSS frames, the network devices might use abbreviated representations of MAC frames so that they would fit the limited bits available in the SIG symbols.

More specifically, the embodiments can include a revised SIG field such that both PBSSID and PAID or their shorter mappings can exist in the SIG field. For example for downlink (DL) frames the configuration can be PAID (6 bits)+short PBSSID (SPBSSID) (3 bits), whereas currently in IEEE 802.11 ac the PAID is 9 bits. For uplink (UL) frames the configuration can be PBSSID (5 bits)+short PAID (SPAID) (4 bits), whereas currently in IEEE 802.1 lac/ah the PBSSID is 9 bits. In some embodiments, there is a unique relationship between PAID and its short mapping, and similarly between PBSSID and its short mapping such as a one-to-one mapping. In these embodiments, the SPAID can be obtained by using a hash function over the corresponding PAID. Similarly, the SPBSSID can be obtained by a known hash function over the PBSSID. Network devices can establish the relationship between PAID and SPAID, and BSSID and SPBSSID using a set of shared hash functions. By observing SPBSSID and SPAID and the known hash function, the network devices can infer an identity of the transmitter. With limited bits available for identifying the transmitting and receiving network devices, there is a chance of ID collision using hashing functions. Thus, the number of bits for SPAID and SPBSSID can in some embodiments be optimized with a selection of a hash function dependent on the size of the wireless communication network or similar factors to limit collision probability.

In some embodiments, by introducing a sub-field in HE SIG-A/B that carries the identification of the transmitter of the frame, it may be required that this identification is carried from the PHY entity to the MAC entity at each receiver for every received frame, and from the MAC entity to the PHY entity at each transmitter for every frame. This is done by introducing a parameter in TXVECTOR (sent from the MAC entity to the PHY entity at the transmitter side) and RXVECTOR (sent from the PHY entity to the MAC entity at the receiver side). This parameter is denoted by TXSTAID. When a non-AP STA sends a frame, it sets the TXSTAID to SPAID, and when an AP sends a frame, it sets the TXSTAID to SPBSSID. Note that if the TXSTAID has the same length as PAID, then when a non-AP STA sends a frame, it sets the TXSTAID to PAID, and when an AP sends a frame, it sets the TXSTAID to PBSSID. When a STA receives a frame the STA evaluates the TXSTAID that is carried in the frame to update its neighboring network device set.

In the above embodiments, the identification appears in the PHY header (i.e. HE SIG-A/B) for sake of easier and less power-consuming processing (the PHY header format is described in further detail herein below). In some instances, the MAC header may also include TA and RA addresses similar to the above PHY IDs, this MAC header information can be utilized when a STA has taken the computational burden to decode the payload.

As the result of above embodiments, the SIG symbol(s) that follows the PHY preamble in an IEEE 802.11 frame would have fields that identify the transmitter and receiver identity, which could be a subset of the following depending on whether the frame is a UL or DL frame or a frame exchanged in an IBSS: 1) PAID, 2) PBSSID, 3) short representation of PAID, 4) short representation of PBSSID, 5) short representation of MAC address of the transmitter, and 6) short representation of MAC address of the receiver. The exact relationship between PAID and its short representation can be defined using a particular hash function or using any other definition. Similarly, the exact relationship between PBSSID and its short representation may be specified by any hashing function or similar relationship. Also, the exact relationship between a MAC address and its short representation can be specified in a similar fashion. The short representation for each of the above IDs might have different length.

Also, in addition to the above SIG symbol(s) that follows the PHY preamble in a frame, the frame might have other fields that facilitate the adaptive threshold process. For instance, there might be a quantized representation of the transmit power of the transmitter of the frame. This representation could be a 2-3 bit representation or more which identifies the range of the transmit power of the transmitter. Also, there might be a field in one of SIG symbol(s) that follows the PHY preamble in the frame that: (a) is set only by an AP, (b) functions as an indication as to whether the AP allows or disallows its associated STAs to use adaptive CCA rules. This field could be a single bit.

Figure 3:
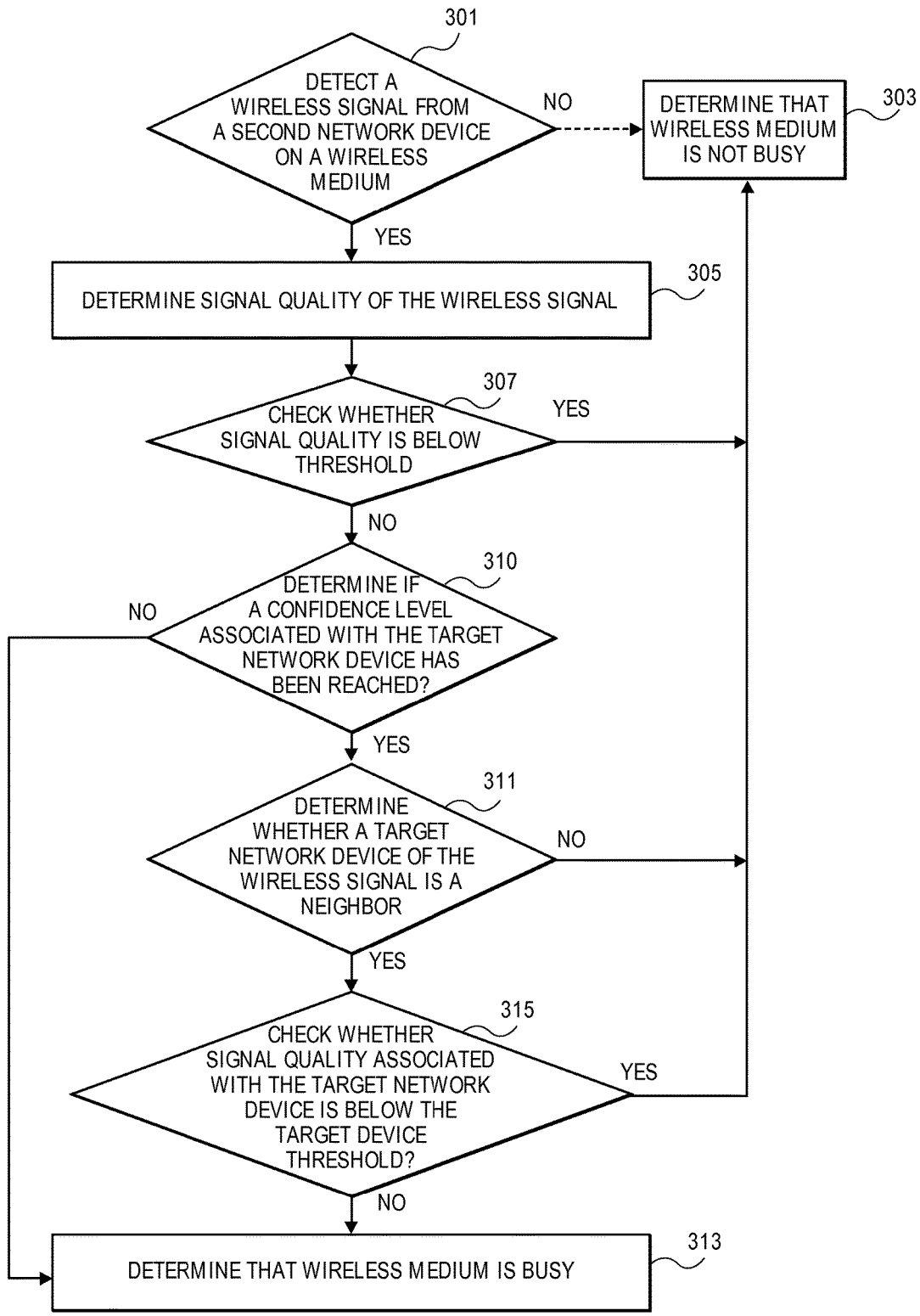
FIG. 3 is a flowchart of one embodiment of the adaptive threshold process.

FIG. 3 is a flowchart of one embodiment of a process for application of an adaptive threshold process. This process is an overview of an adaptive threshold process (e.g., an adaptive CCA process) as described herein, where an implementing network device seeks to transmit on a given wireless channel in a wireless communication system. The process can be triggered in response to detecting a wireless signal from a second network device on a wireless medium while attempting to access/assess the status of the wireless medium (Block 301). In one example, the process can be initiated by making a check to determine whether the start of a frame is detected on a shared wireless medium (i.e., a frame is already being transmitted on the wireless medium, such as a wireless channel, by another device). In this example, the receiver of the implementing network device can continuously monitor the wireless medium to detect frames on the wireless medium as part of a channel access process and/or carrier sensing process. In some embodiments, if there is no frame being transmitted on the wireless medium then the implementing network device can transmit any queued frame, after backing off according to the conventions specified in IEEE 802.11, such as enhanced distributed channel access (EDCA) or distributed coordination function (DCF), because the wireless medium is considered not busy (idle) if other additional qualifications are met (i.e., Idle state qualifications are met).

A determination of the signal quality of the wireless signal may thereafter be performed (Block 305). In the example, if there is a frame being transmitted (which can be determined from detecting a preamble in the signal on the wireless medium), then the signal quality level of the frame being received on the wireless medium can be determined. Any metric (e.g., RSSI or similar values) can be utilized as a signal quality level and any process can be utilized to identify the metric, including ED, CS, or similar measurement functions. In some instances, the frame cannot be discretely detected, but the signal quality of a transmitting signal can be detected and utilized.

A determination is then made whether the transmitting wireless signal (e.g., a frame) is coming from a distant station that would not be disrupted by simultaneous transmission on the wireless medium. A check is made whether the signal quality of the wireless signal (e.g., a frame) is below a threshold (e.g., a CCA threshold such as −82 dBm for a 20 MHz channel) (Block 307). If the signal quality is below this threshold, then the signal originates too far away and the wireless medium is considered to be not busy (assuming a pre-determined period without being busy has elapsed, e.g., after DIFS, after a backoff time or similar conditions are met) (Block 303) enabling the transmission by the first network device (e.g., an implementing station) of its own data (e.g., a queued frame). If the signal quality of the received frame is not below the threshold, then a target network device (e.g., by looking at the RX ID or similar information) of the received wireless signal is determined and a check is made whether a confidence level associated with the target network device has been reached (Block 310). A confidence level is a metric that is applied to the information collected about the neighboring network device set described herein and is specific to each tracked network device in the neighboring network device set. Any confidence level metric or measurement can be utilized that indicates a predetermined number of received frames have been collected in a given time period from the target network device such that an accurate representation of the target network device position or likelihood of interference is known relative to the implementing network device. The confidence level can be determined to be reached by looking at the history of signal quality values of received frames for a target network device, by maintaining a counter of such signal quality values of the received frames or through use of a similar mechanism.

Additionally, the confidence level can be determined to be reached by looking at the history of received frames. Where a large set of the frames have a network device as the target device of the frame but in none or a few frames the network device has appeared as the transmitting device of a frame, it may be determined that the device is not a neighbor with high confidence. If a confidence level associated with the target network device has not been met, then the wireless medium over which the wireless signal was received is determined to be busy (Block 313). This ensures that a potential neighbor is not interfered with by the implementing network device.

In some embodiments, when the target network device is not present in the neighboring network device set, because no frames have been recently received from the target network device, or if the neighboring network device set indicates that no frames have been recently received from the target network device, the implementing device may determine that the target network device is sufficiently far away and the medium is idle (not busy) (Block 303).

If the confidence level associated with the target network device has been reached, then a check is made whether a target network device of the wireless signal (e.g., a target receiver of the received frame) is a neighbor (e.g., in the neighboring network device set) (Block 311). If the target network device is not a neighbor (e.g., a target receiver of the received frame is not in the set), then the wireless medium is considered not busy (Block 303) or idle when related conditions are met (a pre-determined period without being busy has elapsed, e.g., after DIFS, after a backoff time or similar conditions) and the implementing station can proceed with the transmission of its queued frame.

If the target network device (e.g., a target receiver of the received frame) is a neighbor (e.g., it is in the nearby/neighbor station set), then a check is made whether a target network device threshold has been exceeded by the signal quality values associated with the target network device (Block 315). In embodiments with adaptive thresholds, the network device utilizes this additional target network device threshold to assess whether the signal quality values that are tracked by the implementing device indicate that transmitting on the wireless channel would interfere with the neighbor network device that is the target network device of the received wireless signal. Thus, the adaptive threshold and target network device thresholds are distinct and independent thresholds. As used herein, a "threshold" generally refers to the adaptive threshold and the target network device or target device threshold is used to refer to this separate threshold for evaluating whether transmission would interfere with a neighbor network device. Any set or combination of policies can be employed in determining whether the neighboring network devices exceeds the target network device threshold. If the target network device threshold is not exceeded, then the wireless channel is determined to be idle (Block 303). If the target network device threshold is exceeded by the signal quality value(s) associated with the target network device, then the wireless medium is considered busy (Block 313) and, in the example, the pending transmission of the queued frame of the implementing network device waits until the frame transmission completes and any reply completes. It should be noted that for purposes of this process the set of network devices that are considered neighbors may change along with the target network device and/or CCA threshold, where being within the CCA threshold identifies neighbors or some similar criteria is used.

In the example of FIG. 1, given the list of neighbors in the neighboring network device set has reached a confidence level, STA0 checks the receiving ID of any captured frame with the neighboring network device set. If the receiving ID of the captured frame appears in the neighboring network device set, then STA0 can evaluate whether to use the same standard sensitive CCA toward the captured frame and wait for the end of the frame, evaluate the signal quality, e.g., as an average RSSI that has been captured from destination network device in past Tmax time interval, and if the RSSI is smaller than a Tmax_RSSI value, the STA might adapt to a less sensitive CCA toward the captured frame and even might assume the medium is available and initiate the back off procedure.

In some embodiments, the process includes the addition of an RXVECTOR parameter denoted by RXRSSI which is sent from PHY entity to the MAC entity for every frame that is received by the network device. A MAC entity processes an RXRSSI parameter of the RXVECTOR of a frame as follows. When the recipient of the frame is not the same network device, the MAC entity adds the RXRSSI value to the list of the RXRSSIs values received from the same network. This is particularly relevant where the neighboring network device set is constructed. In some embodiments, all the previous RXRSSI values up to Tmax is stored for each transmitting network device. In some other embodiments, all the previous RXRSSI values up to Tmax is averaged for each transmitting network device. The averaging function could be uniform averaging, or moving average where older RXRSSI values are gradually phased out of the average.

The embodiments can be configured to support the presence of legacy devices that do not support the modified SIG implementations. While reading SIG of the frames from neighboring network devices, each network device would arrive at a conclusion of what percentage of the network devices around the computing device are legacy devices. For sake of fairness toward legacy devices, it is important to apply a standard threshold (e.g., a CCA threshold of −82 dBm) if there are more legacy network devices than a given threshold. Such a legacy threshold being a number or percentage of legacy devices in a wireless communication system such as WLAN. In order to gain more from the adaptive threshold process (e.g., an adaptive CCA), an alternative is that the network device optionally read MAC headers of the legacy frames, read the AIDs and process them with the same principle as outlined herein above, so that the network devices can make decisions similar to the adaptive threshold process described herein.

In some embodiments, the adaptive threshold process can be limited to DL applications. Due to additional processing required by the suggested proposal, one might suggest to limit the previously discussed proposal for AP only, hence to allow only APs only to use adaptive CCA. This would make sense due to larger percentage of DL vs UL in most WLANs. In such an example scenario, APs could adopt a CCA threshold greater than −82 dBm for frames that do not belong to the same BSS and likely their intended receiver is not within the coverage of the AP. To perform such processing in APs only, one approach is to use the embodiments described herein above with the ID's in SIG (PAID and SPBSSID in DL frames, and BSSID and SPAID in UL frames) and let only APs change the CCA adaptively. In a further embodiment, the APs read the MAC header of all the frames each receives and performs the adaptive CCA threshold process to find out whether there are nearby STAs that belong to other BSS or not, and decide accordingly to whether to adapt the CCA threshold to be greater than −82 dBm for the frames that do not belong to the same BSS. Note that in this approach there is no need to have new IDs in SIG, i.e. the SIG would have the same ID's as before (PAID in DL and PBSSID in UL as in IEEE 802.11ac).

In some embodiments where shortened IDs are generated using hashing functions, some outcomes of the adaptive threshold process can be affected. Due to the limited bits assigned to PAID and SPAID, it is possible that two STAs have similar PAID or SPAID. However, what affects the outcome of the adaptive threshold process is if two STAs that are in coverage of each other and have the same PAID or SPAID. In general, if there are multiple STAs with the same PAID or SPAID it would cause other STAs to stick with a standard CCA threshold (e.g., −82 dBm) for those STAs. This means that collision in IDs is not catastrophic and only makes other STAs more conservative.

In some embodiments, received wireless signals that are being processed may have multiple destination. Frames that include multiple destinations can include DL multiple user (MU) multiple in multiple out (MIMO) frames, or DL OFDMA frames. The criteria for handling such frames are a modification of the processes for single destination frames discussed above. For such multiple destination wireless signals (e.g., frames), the network device obtains the potential recipient of the frames from the group identification. The group identification could be carried in an IEEE 802.11 ac-GID, or it could be carried in other forms, such as explicitly identifying the set of recipients. Whatever the means of group identification is, the network device obtains some knowledge of the potential recipients from the SIG fields within the MU MIMO PPDU or OFDMA PPDU. Upon obtaining such knowledge, network device checks whether any of the potential destination network devices are within its neighboring network device set. Thus, instead of checking for just a single destination network device in the neighboring network device set, the process would check for each of the destination network devices. If none of the potential recipient network devices are within the neighboring network device set, then the implementing device can consider the wireless medium non busy and would be allowed to prepare for its own transmission if other conditions are met (e.g., DIFS and backoff).

In some embodiments, if the implementing network device sees none of the potential recipients have an average signal quality above a threshold (e.g., an RSSI larger than RSSI_Th) (i.e. the STAs could be within the neighboring network device list, but are far enough that they likely receive frames from STA0 with RSSI less than RSSI_Th), then network device can consider the shared wireless medium non busy if other conditions are met. If the receiving ID of the captured frame appears in the neighboring network device set, then the implementing network device can be configured to use the same standard sensitive threshold (e.g., CCA threshold) toward the captured frame and wait for the end of the frame, or evaluates the signal quality (e.g., the average RSSI that has been collected captured the destination network device in past TBD_Tmax time interval, and if the RSSI is smaller than a RSSI_Th value, the network device might adapt to a less sensitive threshold toward the captured frame and even might assume the medium is available and initiates the back off procedure of other conditions are met. Alternatively, in some embodiments the network device always uses a standard sensitive threshold when it receives MU frame, any frame that triggers transmission of MU frame such as Trigger frame, broadcast frames, or multicast frames.

In some embodiments, wireless signals may encompass the transmission of frames with larger than 20 MHz bandwidth: In these embodiments, the network device identifies the availability of the primary 20 MHz channel according to processes described herein above. If the network device wants to send frames with larger bandwidth such that it occupies secondary 20 MHz, secondary 40 MHz, or secondary 80 MHz channel, then the network device uses the following process for the additional channels. If the secondary 20 MHz, secondary 40 MHz, or secondary 80 MHz channel is available for a minimum duration time such as point coordination function (PCF) IFS (PIFS), short IFS (SIFS), or DIFS, then the network device assumes the secondary channel is available and might initiate a frame that covers the primary 20 MHz channel and the secondary channel(s).

In some embodiments, there may be an adjustment made due to power mismatch between network devices. There is a chance that TX power of a network device and those network devices in its neighborhood might be different. Hence, there is a chance that network device might be in the neighborhood of another network device, but that other network device may not be in the neighborhood of the implementing network device. In this situation, the implementing network device would realize that the transmit power of the other network device is higher compared to its own transmit power. This can be obtained by comparing the quantized TX power indication that is carried in one of the SIG symbols that follows the PHY preamble in an 802.11 frame. If this situation is encountered, implementing network device, which already has detected frames originated from the other network device, and has assigned the other network device to the neighboring network device set can use a less sensitive threshold toward the captured frame destined to the other network device, or even might assume the medium is not busy if other criteria are met and prepare for transmission of its own frame after initiating the back off procedure etc.

In one embodiment, the adaptive threshold process has a TX-power-level indication carried in the HE SIG symbol of each frame so that a receiving network device can approximately compare its own power with that of the transmitting network device of the frame. This TX-power-level indication sub-field is a quantized indication and might have a few bits of length to indicate the transmit power that the transmitting network device has used for the frame is within the range of e.g. P1 mW to P2 mW. By introducing such a sub-field in HE SIG-A or HE SIG-B, it is now required that this power indication is carried from the MAC entity to the PHY entity at the transmitter side and also from the PHY entity to the MAC entity at the receiving side. This is done by introducing a parameter in TXVECTOR (sent from the MAC entity to the PHY entity at the transmitter side) and RXVECTOR (sent from the PHY entity to the MAC entity at the receiver side).

As an example, consider FIG. 1, where STA0 is the reference STA. When STA0 is awake, it records the relevant IDs (TA/RA or PAIDs/BSSIDs and their short forms that might appear in PHY/PLCP header) of the frames that captures. STA0 establishes the known relationship between the transmitting and receiving IDs (PAID/PBSSID and their short forms). This processing is gradually updated whenever new IDs are collected. So after a while STA0 realizes that the transmit IDs related to STAs 1-10 appear on the frames it has captured and infers that they are nearby, i.e. within −82 dBm-coverage of STA0. This constitutes the neighborhood list for STA0. Subsequently, if STA0 captures a frame that its recipient is any of the STA 1-10, then STA0 would either (a) stick with CCA=−82 dBm, or (b) evaluates the situation by evaluating the average RSSI that has captured from each destination neighboring STA in past TBD_Tmax time interval, and if the RSSI is smaller than a RSSI_Th value, the STA might adapt to a less sensitive CCA toward the captured frame and even might assume the medium is available and initiates the back off procedure. If STA0 captures a frame sent by STA 1-10, but for a destination other than STA 1-10, then STA0 can adapt to CCA>−82 dBm (since STA0 knows that the recipient is outside of its −82 dBm-coverage).

Also note that the neighboring network device set is formed based on the frames that are captured on channels that include a primary channel. This is due to the requirement that a STA sends and receives at least occupy the primary 20 MHz channel. Hence, the neighboring network device set that is obtained as in previous paragraphs, is actually the neighboring network device set for the primary channel. In general, the neighboring network device set for the primary and secondary channels could potentially be different lists. For instance, a nearby STA denoted by STA1 might be operating only on secondary 40 MHz channel and not at the primary 40 MHz channel. This leads to the result that STA1 would not appear in the neighbor list that STA0 has created based on its primary channel. In one embodiment, STA0 evaluates the medium availability based on the primary channel using the neighboring network device set that is created from the moving history of the frames exchanged on the primary channel. And, if STA0 wants to send a frame wider than the primary 20 MHz channel, then it needs to observe the availability of the secondary 20 MHz, secondary 40 MHz, and secondary 80 MHz according to the rules specified in the spec. Although described in relation to primary and secondary channels, the techniques described herein may be applied for any set of sub-channels.

Figure 4:
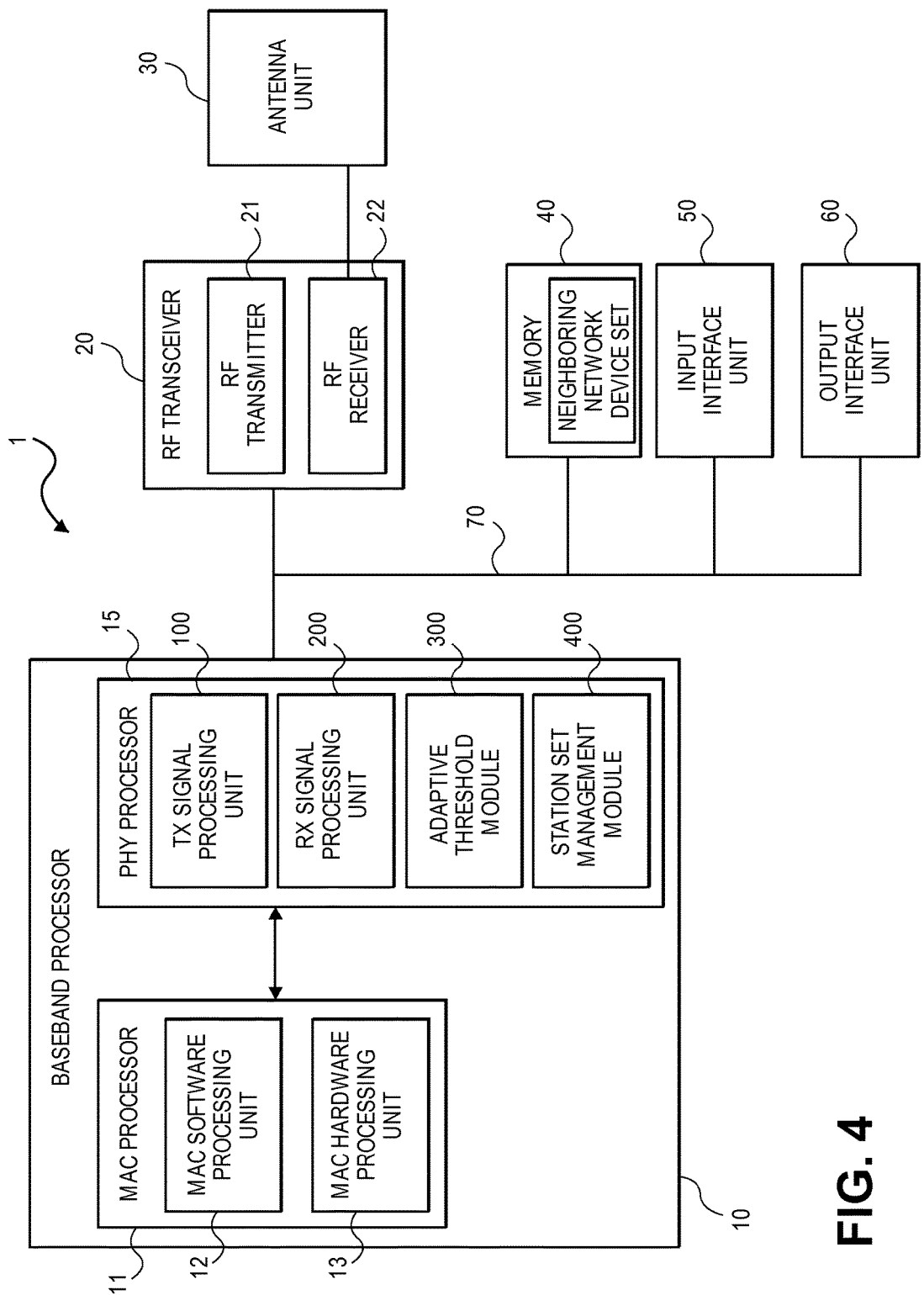
FIG. 4 is a diagram of a network device implementing a station or access point that executes an adaptive threshold process.
Figure 7:
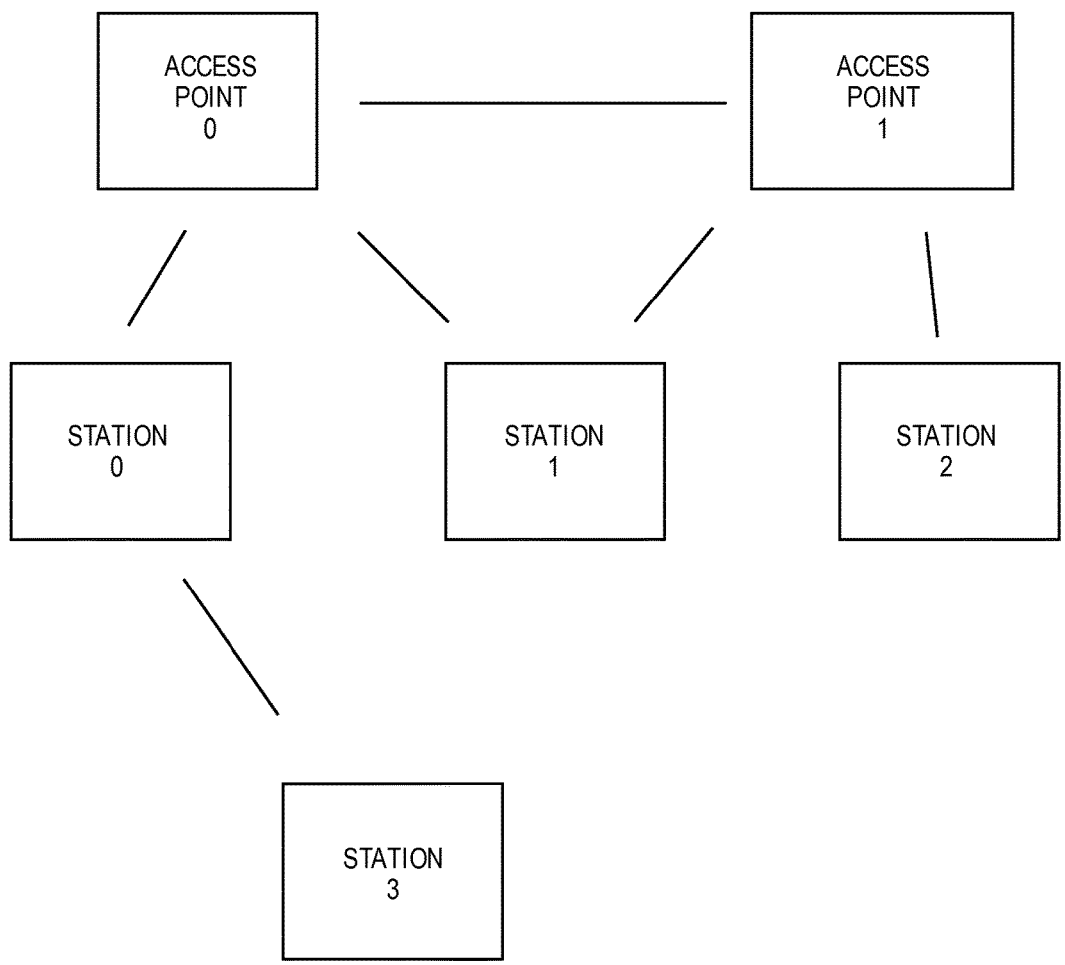
FIG. 7 is a diagram of an example wireless local area network.

FIG. 4 is a diagram of a network device implementing a station or access point that executes an adaptive threshold process and a neighboring network device set management process. In a wireless local area network (WLAN) such as the example WLAN illustrated in FIG. 7, a basic service set (BSS) includes a plurality of network devices referred to herein as WLAN devices. Each of the WLAN devices may include a medium access control (MAC) layer and a physical (PHY) layer according to IEEE (Institute of Electrical and Electronics Engineers) 802.11 standard. In the plurality of WLAN devices, at least one WLAN device may be an access point (AP) station (e.g., access point 0 and access point 1 in FIG. 7) and the other WLAN devices may be non-AP stations (non-AP STAs), (e.g., stations 0-3 in FIG. 7). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 7, a WLAN can have any combination of stations and access points that can form discrete network, an ad hoc network or any combination thereof. Any number of APs and stations can be included in a WLAN and any topology and configuration of such APs and stations in the network can be utilized.

Also, there might be a field in one of SIG symbol(s) that follows the PHY preamble in an 802.11 frame that: (a) is set only by AP, (b) functions as an indication to whether AP allows or disallows its associated STAs to use adaptive threshold rules. This field could be a single bit.

Referring to FIG. 4, the example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC).

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 5 and 6. In some embodiments, the PHY processor 15 can also implement the adaptive threshold module 300 and/or the station set management module 400. The adaptive threshold module 300 and the station set management module 400 can implement the respective functions for any combination of the embodiments described herein above with regard to FIGS. 1-3, in one embodiment, the adaptive threshold module 300 can implement the adaptive threshold process and the station set management module 400 can implement the neighboring network device set management process. In other embodiments, these modules may be implemented by or distributed over both the PHY processor 15 and the MAC processor 11. These modules may be implemented as software or as hardware components of either the PHY processor 15 or MAC processor 11. These modules can be implemented as components of the transmitting signal processing unit 100 and the receiving signal processing unit 200 or as discrete components. In a further embodiment, the adaptive threshold module 300 and/or the station set management module 400 can be implemented by separate components or processors within the baseband processor.

The baseband processor 10, the memory 40, the input interface unit 50, and the output interface unit 60 may communicate with each other via the bus 70. The RF transceiver 20 includes an RF transmitter 21 and an RF receiver 22. The memory 40 may further store an operating system and applications. In some embodiments, the memory may store the nearby stations set. The input interface unit 50 receives information from a user and the output interface unit 60 outputs information to the user.

The antenna unit 30 includes one or more antennas. When a multiple-input multiple-output (MIMO) or a multi-user MIMO (MU-MIMO) system is used, the antenna unit 30 may include a plurality of antennas.

FIG. 5 is a schematic block diagram exemplifying a transmitting signal processor in a WLAN device. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

FIG. 6 a schematic block diagram exemplifying a receiving signal processing unit in the WLAN. Referring to FIG. 12, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

A frame as used herein may refer to a data frame, a control frame, or a management frame may be exchanged between WLAN devices. The data frame is used for transmission of data forwarded to a higher layer. The WLAN device transmits the data frame when the wireless medium is considered to be in an idle condition or state such as after performing backoff if a DIFS has elapsed from a time when the medium was not busy or under similar conditions. The management frame is used for exchanging management information, which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for an associated access category (AC), i.e., AIFS[AC] has elapsed. In this case, the data frame, the management frame, or the control frame, which is not the response frame, may use the AIFS[AC].

As discussed herein CCA and in particular as an embodiment of an adaptive threshold module is implemented to manage the transmission of frames by the WLAN device. CCA may implement a CSMA (carrier sense multiple access)/CA (collision avoidance) based frame transmission procedure or similar procedure for avoiding collisions between frames in a channel.

Figure 8:
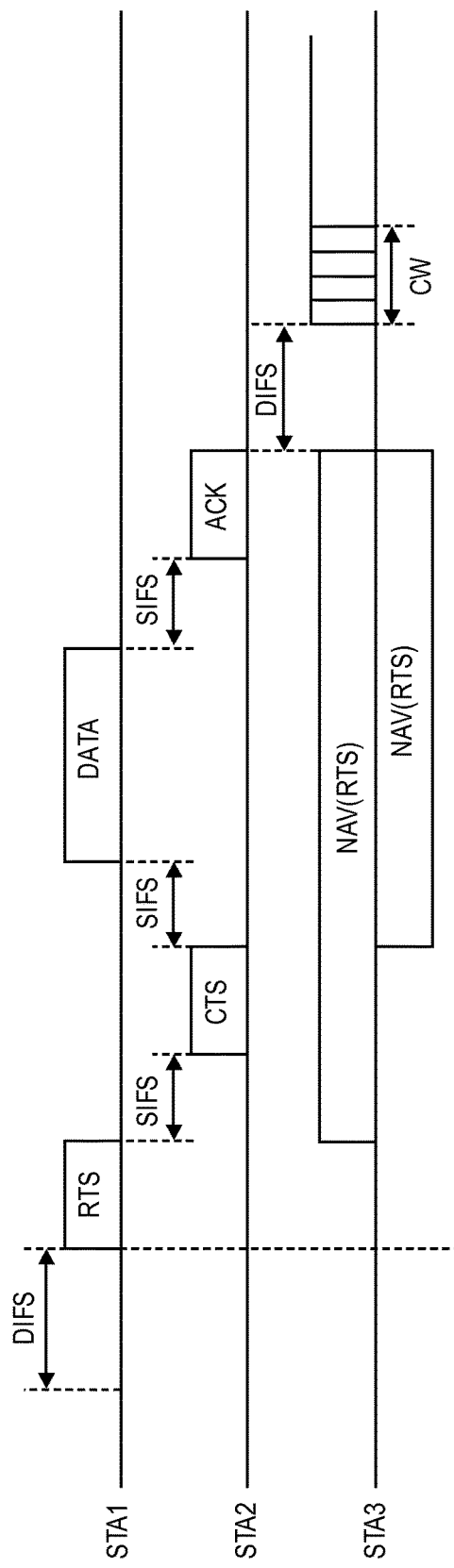
FIG. 8 is a timing diagram providing an example of the CSMA/CA transmission procedure.

FIG. 8 is a timing diagram providing an example of the CSMA/CA transmission procedure. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

The PHY entity for IEEE 802.11 implemented in the WLAN device is based on orthogonal frequency division multiple access OFDM or OFDMA. In either OFDM or OFDMA PHY layers, a STA is capable of transmitting and receiving PPDUs that are compliant with the mandatory PHY specifications. In a PHY specification, set of MCS and maximum number of spatial streams are defined. Also in some PHY entities, downlink and/or uplink MU transmission with a maximum number of space-time streams per user and up to a fix total number of space-time streams is defined.

Figures 9, 10:
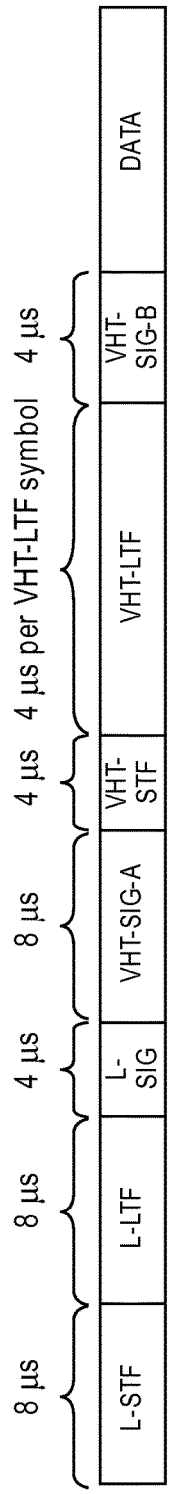
FIG. 9 is a diagram of a very high throughput (VHT) PPDU utilized by a WLAN device PHY layer.
FIG. 10 is a table of the fields of the VHT PPDU.

FIG. 9 is a diagram of a very high throughput (VHT) PPDU utilized by the WLAN device PHY layer. FIG. 10 is a table of the fields of the VHT PPDU. Some PHY entities define PPDU that are individually addressed (where identification is based on AID or Partial AID) and some are group addressed (where identification is based on Group ID, GID). Some PHY entities provide support for 20 MHz, 40 MHz, 80 MHz and 160 MHz contiguous channel widths and support for 80+80 MHz non-contiguous channel width. The data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of 1/2, 2/3, 3/4 and 5/6.

In each PHY entity, there would be fields denoted as L-SIG, SIG-A, SIG-B where some crucial information about the PSDU attributes are listed. These symbols are usually encoded with the most robust MCS. The L-SIG, SIG-A, SIG-B have very limited number of bits and it is desired to encode them in the most compact form possible. In a receiving STA, first these symbols are decoded in order to obtain vital information about the PSDU attributes and some MAC attributes. In IEEE 802.11 ac, these symbols are called VHT SIG-A and VHT SIG-B symbols.

As discussed above, WLAN devices are currently being deployed in diverse environments. These environments are characterized by the existence of many access points and non-AP stations in geographically limited areas. Increased interference from neighboring devices gives rise to performance degradation. Additionally WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved power consumption for battery-operated devices.

IEEE 802.11 ax or HE SIG-A and IEEE 802.11 ax or HE SIG-B are referred to simply as simply by SIG-A and SIG-B and are amendments to the IEEE 802.11 standard directed at addressing these problems. Unlike previous amendments where the focus was on improving aggregate throughput, this amendment focuses on improving metrics that reflect user experience, such as average per station throughput, the 5th percentile of per station throughput of a group of stations, and area throughput. Improvements will be made to support environments such as wireless corporate office, outdoor hotspot, dense residential apartments, and stadiums.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

Note the operations of the flowcharts are described with reference to the exemplary embodiments of the diagrams. However, it should be understood that the operations of flowcharts can be performed by embodiments other than those discussed, and the embodiments of the diagrams can perform operations different than those discussed with reference to the flowcharts.

While the flowcharts in the figures herein above show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a first network device, the method to provide an adaptive clear channel assessment (CCA) process in a wireless local area network (WLAN) to determine availability of a wireless channel in the WLAN, the method comprising:
    detecting, by the first network device, a wireless signal from a second network device on a wireless medium;
    determining whether a target network device of the wireless signal is a neighbor of the first network device; and
    comparing a target device threshold with one or more signal quality values associated with transmissions of the target network device in response to determining that the target network device is a neighbor of the first network device.

2. The method of claim 1, further comprising:
    determining that the wireless medium is busy in response to determining that the one or more signal quality values are greater than the target network device threshold.

3. The method of claim 1, further comprising:
    determining that the wireless medium is idle in response to determining that the one or more signal quality values are less than the target network device threshold.

4. The method of claim 1, further comprising:
    comparing a signal quality of the wireless signal with a CCA threshold; and
    determining that the wireless medium is idle in response to the signal quality of the wireless signal being below the CCA threshold.

5. The method of claim 1, further comprising:
    determining whether a confidence level has been reached for the target network device, where the confidence level indicates a predetermined number of received frames in a time period have been collected from the target network device to present an accurate representation of the target network device relative to the first network device, wherein the comparing the target device threshold with one or more signal quality values associated with transmissions of the target network device is performed in response to determining that the confidence level has been reached.

6. The method of claim 5, further comprising:
determining the wireless medium is busy in response to determining that the confidence level has not been reached.

7. The method of claim 1, wherein the one or more signal quality values is a running average associated with signal quality of wireless transmissions of the target network device.

8. The method of claim 1, wherein the wireless signal is a multi-user signal, the method further comprising:
determining that the wireless medium is idle when one or more target devices of the wireless signal is not a neighbor of the first network device.

9. The method of claim 1, further comprising:
determining that the first network device has not received a wireless signal from the target network device in a predetermined time period; and
determining that the wireless channel is idle in response to determining that the first network device has not received a wireless signal from the target network device in the predetermined time period.

* * * * *